No. 831,950. PATENTED SEPT. 25, 1906.
R. R. HART.
BRAKE.
APPLICATION FILED FEB. 17, 1906.
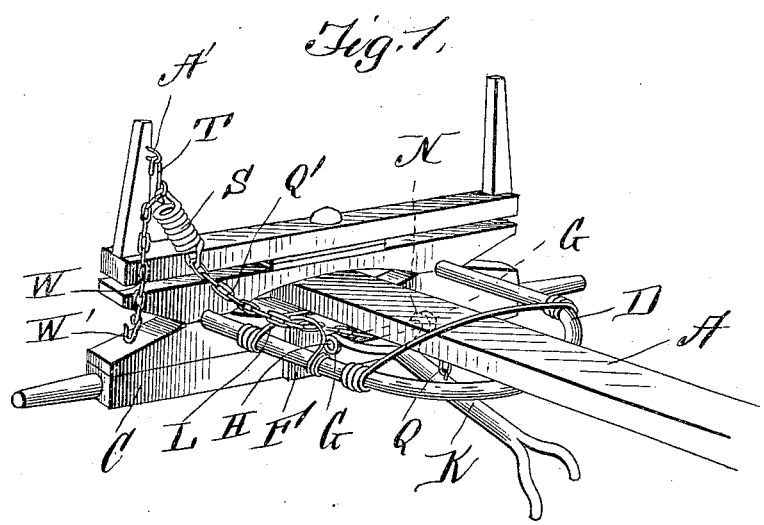
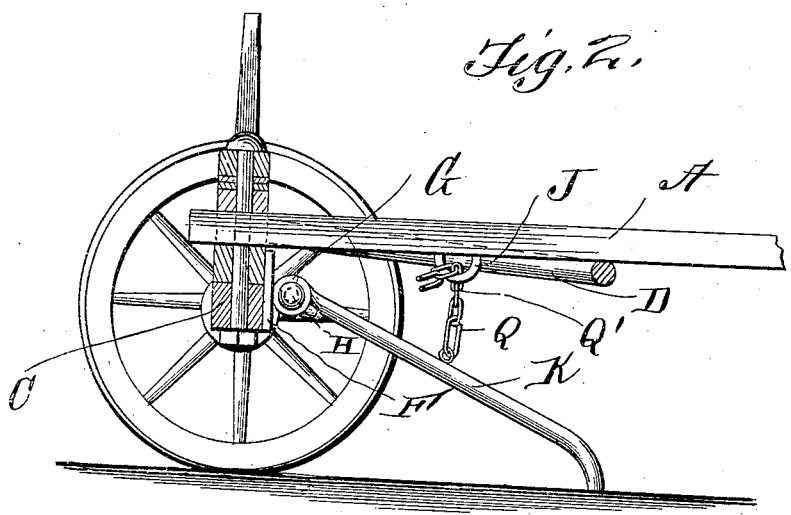
Witnesses
R. A. Boswell
Ada R. Fowler
Inventor
Roy R. Hart,
By Franklin H. Hough
his atty.

UNITED STATES PATENT OFFICE.

ROY R. HART, OF RAPATEE, ILLINOIS.

BRAKE.

No. 831,950.  Specification of Letters Patent.  Patented Sept. 25, 1906.

Application filed February 17, 1906. Serial No. 301,664.

*To all whom it may concern:*

Be it known that I, ROY R. HART, a citizen of the United States, residing at Rapatee, in the county of Knox and State of Illinois, have invented certain new and useful Improvements in Wagon-Brakes; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in brake mechanism for wagons, and comprises a simple and efficient hold-back means attached to the wagon and designed to hold the wagon from movement when stopping upon an incline; and it consists, essentially, of a pointed pivotal member mounted upon the front axle of a vehicle and having spring-actuated connection with a bolster of the wagon, affording means whereby the latter may be allowed to turn without moving the hold-back bar or member.

My invention consists, further, in various details of construction and combinations and arrangements of parts, which will be hereinafter fully described and then specifically defined in the appended claims.

I illustrate my invention in the accompanying drawings, in which—

Figure 1 is a perspective view of my apparatus shown as applied to a wagon-truck; and Fig. 2 is a sectional view longitudinally through the reach, showing parts of the invention in elevation.

Reference now being had to the details of the drawings by letter, A designates the reach and C the forward axle of a wagon. D designates a hound which is fastened to said forward axle and upon which the reach rests.

F designates a plate which is fastened to the rear edge of the forward axle, and two eyes G project through said plate and support a pin H. K designates a bar the ends of which are forked, one of said forked ends having eyes N, which are pivotally mounted upon said pin H, and the opposite forked end is designed to engage the ground to hold the wagon from movement when stopping upon an incline. Q designates a link which is connected to said bar, and Q' is a chain fastened to said link and passing through a staple J, secured to the under side of the reach. L designates a loop made of a piece of wire, the ends of which are coiled about said hound, and through said loop the chain Q' is adapted to pass. S designates a spring which is fastened to one end of said chain, and T is a hook fastened to said spring and adapted to engage an eye A' upon one of the standards of the bolster whereby the holdback-bar may be held in an inoperative position. A second chain W is fastened to said spring and has a hook W' secured thereto for attachment to the eye A' when the bar is lowered down.

From the foregoing it will be noted that by the provision of a holdback device, as shown and described, means is afforded for allowing the bolster to turn without drawing the bar out of the position shown in the drawings, the spring yielding to compensate for the turning of the truck.

What I claim is—

1. In combination with the truck of a wagon, a bar pivoted at one end to the forward axle, a chain secured to said bar, a spring secured to said chain, and connections between said spring and the standard of a bolster, as set forth.

2. In combination with the truck of a wagon, a bar pivoted at one end to the forward axle, a chain secured to said bar, an eye secured to the reach and through which said chain passes, a loop fastened to the hound of the truck and through which said chain passes, and yielding connections between said chain and standard of the bolster, as set forth.

3. In combination with the truck of a wagon, a bar pivoted at one end to the forward axle, a chain secured to said bar, an eye secured to the reach and through which said chain passes, a loop fastened to the hound of the truck and through which said chain passes, a spring secured to said chain, a hook fastened to said spring, and an eye upon the bolster engaged by said hook, as set forth.

In testimony whereof I hereunto affix my signature in the presence of two witnesses.

ROY R. HART.

Witnesses:
 MARY E. HART,
 C. I. DAVIS.